United States Patent [19]
Carter

[11] Patent Number: 5,967,166
[45] Date of Patent: Oct. 19, 1999

[54] SEALING ASSEMBLY AND METHOD

[75] Inventor: Anthony E. Carter, Houston, Tex.

[73] Assignee: Daniel Industries, Inc., Houston, Tex.

[21] Appl. No.: 09/012,751

[22] Filed: Jan. 23, 1998

[51] Int. Cl.[6] ...................................................... F16K 1/00
[52] U.S. Cl. .............................. 137/1; 251/330; 251/250; 251/284
[58] Field of Search .................................... 251/330, 214, 251/248, 250, 284; 137/1

[56] References Cited

U.S. PATENT DOCUMENTS

| | | | |
|---|---|---|---|
| 1,996,192 | 4/1935 | Daniel | 251/250 X |
| 2,217,216 | 10/1940 | Davis | 251/250 X |
| 4,307,745 | 12/1981 | McGee | 251/330 X |
| 4,682,757 | 7/1987 | Shelton | 251/330 X |

*Primary Examiner*—Kevin Lee
*Attorney, Agent, or Firm*—Conley, Rose & Tayon, P.C.

[57] ABSTRACT

A sealing assembly is provided for securing an opening in a seat having a seating surface. Typically, the sealing assembly of the present invention adapted for use with, for example, a dual-chamber orifice fitting. The sealing assembly comprises a drive, a carrier, a strip, a stop and a guide. The drive is actuateable for movement. The carrier is associated with the drive and moveably actuated by the drive. The strip is engaged with the drive for moving with the drive or at a right angle to the drive. The stop is engageable with the strip such that when the strip and the stop are engaged, the strip moves at a right angle to the drive, and when the strip and the stop are not engaged, the strip moves with the drive. The guide secures the strip, the carrier and the drive for operation in any orientation. When the stop is sufficiently displaced from the drive and the strip, the opening in the seat is unobstructed. And when the stop has engaged the strip and the drive is moving toward the nearest position to the stop, the strip is approaching the seat in a parallel manner. Such that when the drive is in its nearest position to the stop, the strip is securely engaged with the seat for securing the opening in the seat. A method for securing an opening in a fitting assembly for use with an orifice plate is also provided.

14 Claims, 13 Drawing Sheets

A method for securing an opening in a fitting assembly for use with an orifice plate, the opening has a seat with a seating surface, the fitting assembly comprising a drive, a carrier, a strip, a stop and a guide

↓

Actuating the drive such that the carrier is associated with the drive and moveably actuated by the drive

↓

Engaging the strip with the drive for moving in at least one of with the drive and at a right angle to the drive

↓

Engaging the stop with the strip such that when the strip and the stop are engaged, the strip moves at a right angle to the drive, and when the strip and the stop are not engaged, the strip moves with the drive

↓

Securing the strip with the guide, the carrier and the drive for operation in any orientation

↓ such that when the stop is sufficiently displaced from the drive and the strip, the opening in the seat is unobstructed, and when the stop has engaged the strip and the drive is moving toward the nearest position to the stop, the strip is approaching the seat in a parallel manner so that when the drive is in its nearest position to the stop, the strip is securedly engaged with the seat for securing the opening in the seat

FIG. 23 though the aperture from the lower chamber to the upper chamber. The valve strip carrier is then operated to move the valve strip back into position such that it covers the aperture to prevent fluids in the lower chamber from passing to the upper chamber. The upper chamber is then vented and the orifice plate can be removed.

SEALING ASSEMBLY AND METHOD

FIELD OF THE INVENTION

The present invention relates to an apparatus to seal an aperture. More particularly, the present invention relates to an apparatus for sealing the aperture located between the first and second chambers of an orifice fitting.

BACKGROUND OF THE INVENTION

The accurate measurement of natural gas and other fluids is of critical concern. The measurement of natural gas and other fluids is required with the production, processing, transportation and distribution of natural gas and fluid products from exploration to utilization. The accurate measurement of fluids having a substantial monetary value, for example, natural gas, natural gas liquids, hydrocarbon gases, hydrocarbon liquids, and the like, is essential to the efficient use of the fluids and controlled cost accounting. Specifically, the accurate measurement of fluids is essential for determining accountable custody transfer determinations.

Pipelines are used to transport fluids such as the production fluids from oil and gas wells, natural gas, natural gas liquids, hydrocarbon gases, hydrocarbon liquids, and the like. The accurate measurement of these fluids is unquestionably important. Instruments are required to accurately measure such fluids in pipelines. Orifice plates are a well known device for assisting in the measurement of such fluids. Orifice plates are installed in special fittings, and the fittings are installed in-line with pipeline sections. An example of such a special fitting is the Daniel® Senior® orifice fitting. The term Senior® as applied to orifice fittings specifically denotes a dual-chamber orifice fitting. Such dual-chamber orifice fittings provide a fast, safe and extremely simple method of changing orifice plates under pressure without interrupting the flow of fluid. The dual-chamber orifice fitting holds the orifice plate in the fluid flow stream, or alternately, the orifice plate is displaced from the fluid flow stream without interrupting the flow of fluid through the pipeline. For example, the Daniel® Senior® orifice fitting has been adapted for use with pipeline sizes from approximately 2 inches to 48 inches, and having a pressure rating of up to 10,000 pounds per square inch. Alternate techniques include interrupting the flow, using costly by-pass equipment, or using valve systems and other fittings required with conventional orifice flange installations.

To permit an orifice plate to be lowered into the pipeline flow using a dual-chamber orifice fitting, valves are located in the fitting to selectively seal and unseal a lower chamber from an upper chamber. The valves can be any of various devices that regulate the flow of gases or liquids through the pipeline, piping or through related apertures by opening, closing, or obstructing ports or passageways. Such valves typically comprise a stainless steel valve strip, or rectangular bar, which is manipulated by a valve carrier engaged with a drive mechanism such as a rack and pinion gear. The valve strip covers the aperture between the lower and upper chambers and is biased against the aperture by springs and by the pressure of the fluid in the pipeline and lower chamber. To effectively seal between the valve strip and the seat attached to the orifice fitting surface which surrounds the aperture, typically, a chemical or petroleum based lubricant is injected through passageways and grooves to seal the joint between the valve strip and the orifice fitting.

To remove the orifice plate from the pipeline using the dual-chamber orifice fitting, a valve strip carrier is operated to move the valve strip away from the aperture, and the orifice plate is then mechanically moved through the aperture from the lower chamber to the upper chamber. The valve strip carrier is then operated to move the valve strip back into position such that it covers the aperture to prevent fluids in the lower chamber from passing to the upper chamber. The upper chamber is then vented and the orifice plate can be removed.

In certain pipeline applications, the slide valve presently used to seal the aperture may not be desirable. Such a condition may exist if the lubricant is not compatible with the pipeline fluid or if an absolute seal is required, particularly at extremely low pipeline pressures. There is a need for a slide valve which does not utilize lubricants and which creates an absolute seal at any pipeline pressure.

Of concern in the present invention is to remove or change orifice plates under pressure without interrupting the flow of fluid. It is, therefore, a feature of the present invention to provide a sealing apparatus for sealing the aperture located between the first and second chambers of an orifice fitting.

A feature of the present invention is to provide a sealing apparatus having a positive engagement assembly.

Another feature of the present invention is to provide a sealing apparatus which can be operated in association with a dual-chamber orifice fitting regardless of the orientation of the fitting.

Another feature of the present invention is to provide a sealing apparatus where the disparity between lubricant and pipeline fluid is not a problem.

A further feature of the present invention is to provide a sealing apparatus where an absolute seal is required.

Yet another feature of the present invention is to provide a sealing apparatus adaptable for extremely low pipeline pressures.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

The present invention discloses a sealing assembly which effectively seals the aperture in a base between first and second chambers of a dual-chamber orifice fitting without using lubricants. A stop is attached to the base. A strip for covering the aperture has an inclined surface located at an angle relative to the surface of the base. A drive is in contact with a carrier which contacts the inclined surface of the strip. In certain embodiments of the invention, the strip includes a seal for sealing the aperture. Alternatively, the strip may be placed in sealing relationship with a seal carried in a seat. To practice the invention in various embodiments, the drive operates the carrier to urge the strip against the stop. Continued operation of the drive and the carrier causes the strip to contact the base defining the aperture to obtain a fluid tight seal between the first and second chambers. A carrier guide secures the sealing assembly in a positively activated manner, providing for operation of the fitting regardless of the orientation of the fitting.

In another embodiment, a sealing assembly is provided for securing an opening in a seat having a seating surface. The sealing assembly comprises a drive, a carrier, a strip, a stop and a guide. The drive is actuateable for movement. The carrier is associated with the drive and moveably actuated by the drive. The strip is engaged with the drive for moving with the drive or at a right angle to the drive. The stop is engageable with the strip such that when the strip and the stop are engaged, the strip moves at a right angle to the drive, and when the strip and the stop are not engaged, the strip moves with the drive. The guide secures the strip, the carrier and the drive for operation in any orientation. When the stop is sufficiently displaced from the drive and the strip, the opening in the seat is unobstructed. And when the stop has engaged the strip and the drive is moving toward the nearest position to the stop, the strip is approaching the seat in a parallel manner. Such that when the drive is in its nearest position to the stop, the strip is securely engaged with the seat for securing the opening in the seat. Alternately, the drive and the carrier may be a unitary member. Typically, the strip and the carrier are repose so as to provide movement of the strip in either the direction of the carrier, or perpendicular to the movement of the carrier.

In yet another embodiment, a method for securing an opening in a fitting assembly for use with an orifice plate is provided. The opening has a seat with a seating surface and the fitting assembly comprises a drive, a carrier, a strip, a stop and a guide. The method comprises actuating the drive such that the carrier is associated with the drive and moveably actuated by the drive. Engaging the strip with the drive for moving the strip with the drive or at a right angle to the drive. Engaging the stop with the strip. When the strip and the stop are engaged, the strip moves at a right angle to the drive, When the strip and the stop are not engaged, the strip moves with the drive. And, securing the strip with the guide, the carrier and the drive for operation in any orientation. When the stop is sufficiently displaced from the drive and the strip, the opening in the seat is unobstructed, and when the stop has engaged the strip and the drive is moving toward the nearest position to the stop, the strip is approaching the seat in a parallel manner so that when the drive is in its nearest position to the stop, the strip is securely engaged with the seat for securing the opening in the seat.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention. For further understanding of the nature and objects of the present invention, reference is made to the following drawings in which like parts are given like reference numbers.

FIG. 23 is a flow diagram illustrating a method of the present invention.

The above general description and the following detailed description are merely illustrative of the generic invention, and additional modes, advantages, and particulars of this invention will be readily suggested to those skilled in the art without departing from the spirit and scope of the invention.

DESCRIPTION OF THE EMBODIMENTS

Figure 1:
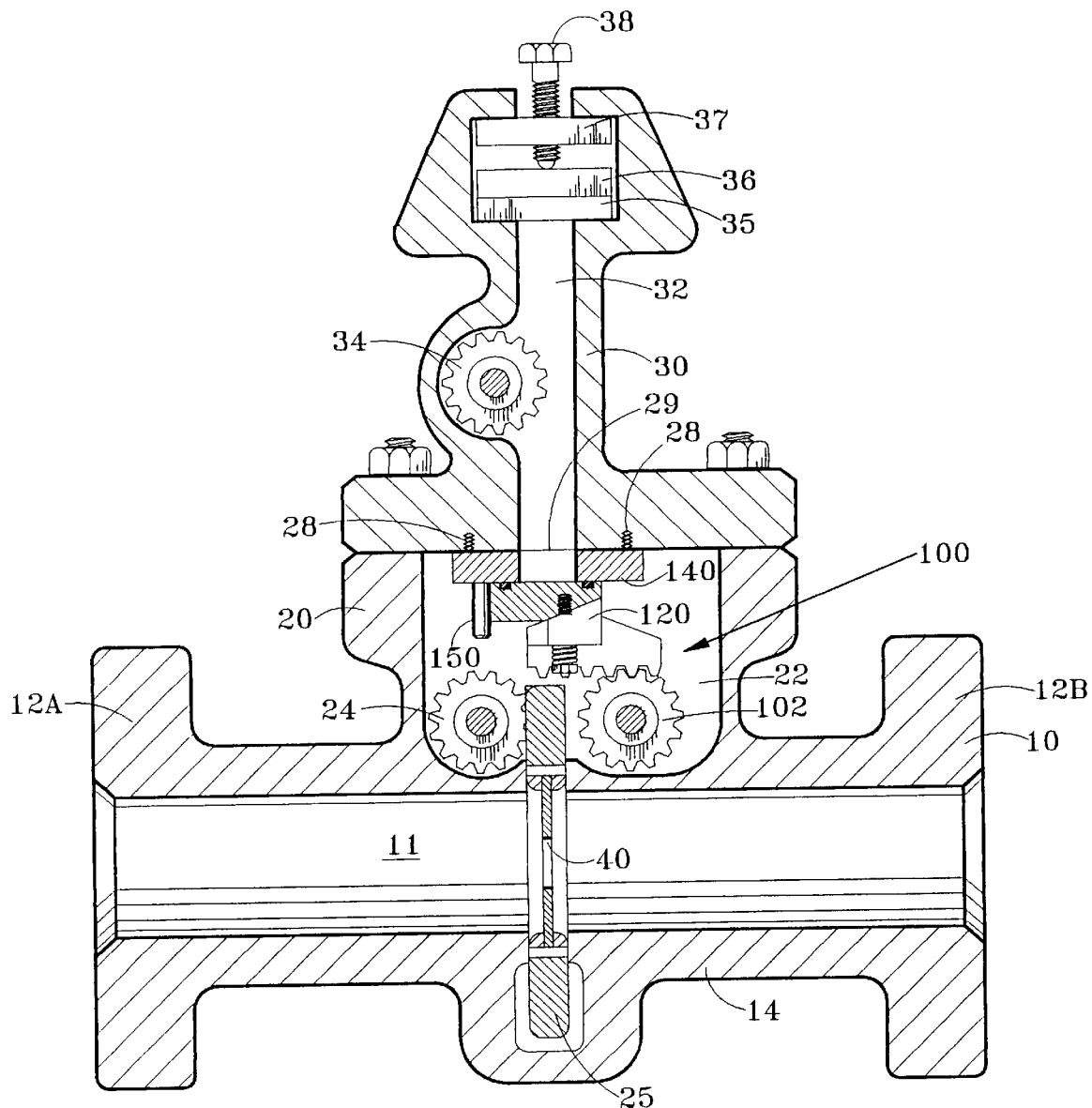
FIG. 1 illustrates a sectional elevation view of a preferred embodiment of the sealing assembly of the present invention in a dual-chamber orifice fitting.

FIG. 1 illustrates a sectional elevation view of a preferred embodiment of the present invention in a dual-chamber orifice fitting. FIG. 1 illustrates a fitting assembly 10 having a first fitting member 20 and a second fitting member 30. The fitting assembly 10 has alternately disposed flanges 12A, 12B. In the first fitting member 20 of the fitting assembly 10, a channel 11 is disposed there through. In engagement with the channel 11 in the first fitting member 20 of the fitting assembly 10 is an orifice plate 40. The orifice plate 40 provides for producing a differential pressure within a pipe section 14.

The second fitting member 30 of the fitting assembly 10 has an upper chamber 32 containing a second plate gear 34. The upper chamber 32 in the second fitting member 30 is secured at one extreme by a gasket 35, a sealing bar 36, a clamping bar 37 and a screw 38. In the first fitting member 20 is a sealing assembly 100, a first plate gear 24 and a gear 102 for engagement with the sealing assembly 100. Various different ways are applicable, and known, for sealing the upper chamber of a dual-chamber orifice plate fitting. Any known method of sealing the chambers of the dual-chamber orifice fitting would comply with the scope of the present invention.

Figure 2:
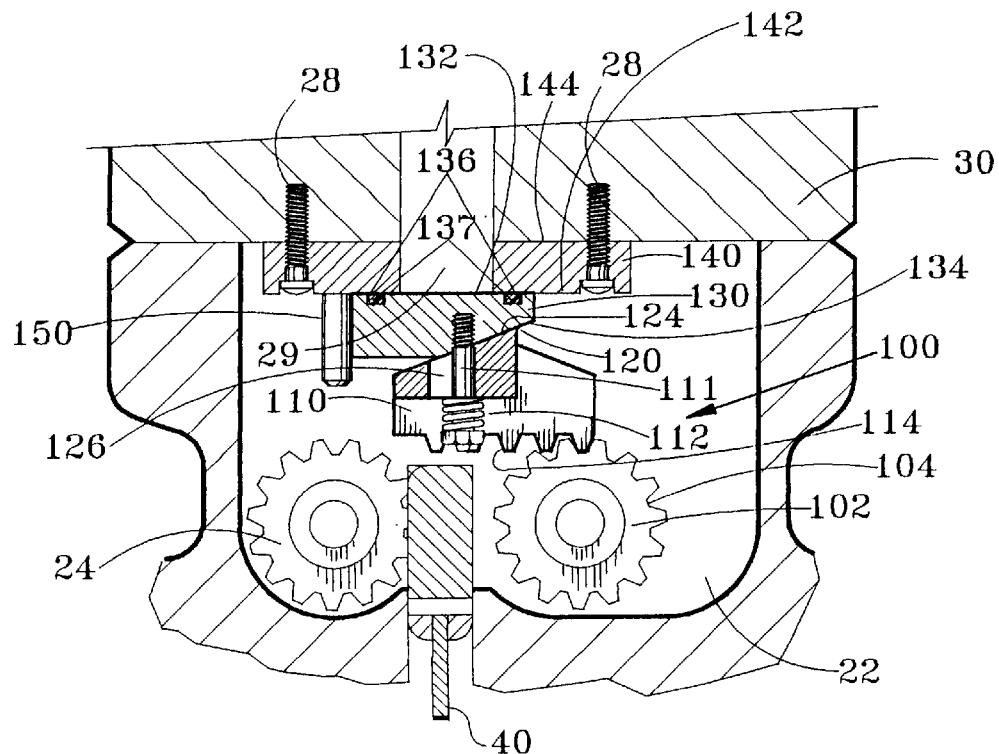
FIG. 2 is an enlarged detail view of FIG. 1 illustrating the sealing assembly of the present invention in a securedly closed position.

FIG. 2 is an enlarged detail view of FIG. 1 illustrating the sealing assembly of the present invention in a securely closed position. FIG. 2 illustrates the sealing assembly 100 within the lower chamber 22. The primary elements of the sealing assembly 100 are a first gear 102, a drive 110, a carrier 120, a strip 130 and a seat 140. The seat 140 is secured to the second fitting member 30 of the fitting assembly 10 using one or more screws 28. An aperture in the seat 140 is in channeled alignment with the aperture 29 in the second fitting member 30. It can be appreciated that the alignment and arrangement of the seat 140 and the second fitting member 30 with respect to the aperture 29 can be different and varied, and still comply with the scope and spirit of the present invention. The first gear 102 engages a plurality of teeth 114 in the drive 110. As the first gear 102 is rotated, the sealing assembly 100 operates to seal the aperture 29 in the second fitting member 30, or alternately, to open the aperture 29 in the second fitting member 30 so that the orifice plate 40 can be lifted into the upper chamber 32 using the first plate gear 24.

The sealing assembly 100 illustrated in FIG. 2 is disposed such that the teeth 104 in the first gear 102 are binding against the teeth 114 of the drive 110. The carrier 120 is pushed in the direction of the movement of the teeth 114 toward a stop 150. The carrier 120 has a sliding surface 124 that engages the strip 130. Also, the carrier 120 has a slot 126 for receiving a bolt 111. The friction applied between the carrier 120 and the strip 130 along the sliding surface 124 is controlled by the pressure asserted along the sliding surface 124 from the spring 112.

As the first gear 102 pushes the teeth 114 toward the stop 150, the sliding surfaces 124, 134 bind when the strip 130 engages the stop 150 causing the strip 130 to move along the stop 150 perpendicular to the seat 140. When the strip 130 engages the stop 150, the bolt 111 shifts within the slot 126 such that the strip 130 slides along the sliding surface 124 of the carrier 120. This sliding effect causes the strip 130 to move at right angles to the stop 150 and along the surface of the stop 150. The seal 137 in the groove 136 of the strip 130 is forced to orthogonally engage the seat 140 such that the aperture 29 is securely closed with the surfaces 142, 132 of the seat 140 and the strip 130, respectively, to engage in a parallel relationship.

Figure 3:
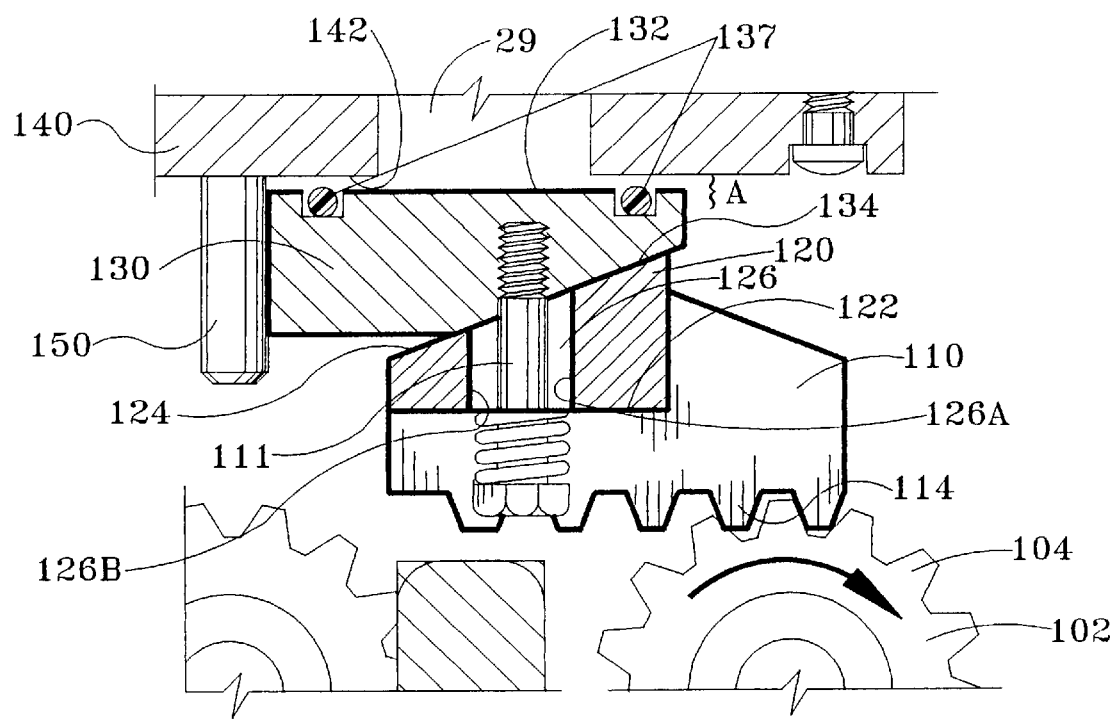
FIG. 3 is an enlarged detail view of FIG. 2 illustrating the sealing assembly of the present invention in an incipiently open position.

FIG. 3 is an enlarged detail view of FIG. 2 illustrating the sealing assembly of the present invention in an incipiently open position. The gear 102 is illustrated moving in a clock wise direction. The teeth 104 in the gear 102 engage the teeth 114 in the drive 110. The bolt 111 disengages from a first side 126A of the slot 126 to be displaced to the center of the slot 126, as illustrated, causing the carrier 120 to move in the direction of the drive 110. As the carrier 120 moves in the direction of the drive 110, the sliding surface 124 of the carrier 120 and a sliding surface 134 of the strip 130 provide a slideably moving surface whereby the carrier 120 moves at right angles to the strip 130. Thus, the carrier 120 moves along a plane parallel to the seat 140 and the strip 130 moves along a plane perpendicular to the seat 140 and along the surface of the stop 150. A gap "A" between the seat 140 and the strip 130 is determined by the size of the slot 126 in the carrier 120. The gap "A" illustrated in FIG. 3 is approximately half the size the gap "A" at its maximum when the bolt 111 engages the second side 126B of the slot 126. As the carrier 120 moves at right angles to the strip 130, the engaging surface 132 is disengaged from the seating surface 142 of the seat 140 such that the seal 137 disengages the seating surface 142 and opens the aperture 29.

Figure 4:
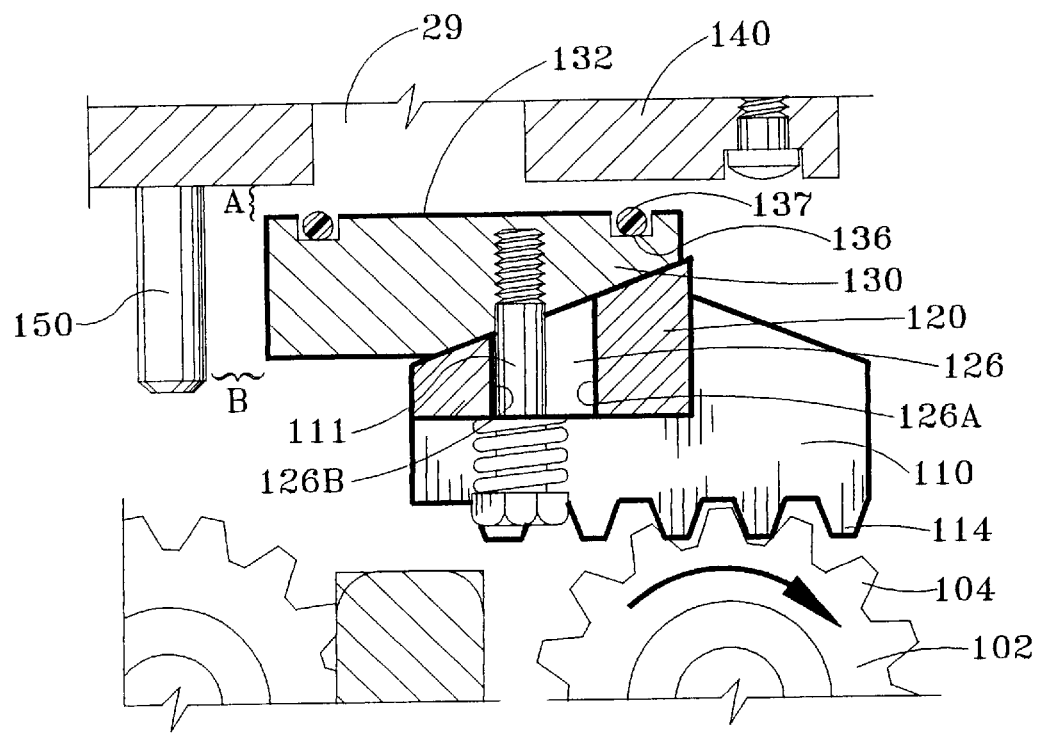
FIG. 4 illustrates the plate sealing assembly of the present invention in a partially displaced, open position.

FIG. 4 illustrates the sealing assembly 100 of the present invention in a partially displaced, open position. The gear 102 having a plurality of teeth 104 engages the drive 110 by its teeth 114 for moving the drive 110 so as to displace the bolt 111 to be engaged with the second side 126B of the slot 126. At this time, the gap "A" between the seat 140 and the strip 130 is at its maximum. Also, the strip 130 is illustrated as having been displaced from the stop 150 by a second gap "B." The second gap "B" will continue to increase until such time as the gear 102 moves fully along the bottom of the drive 110. FIG. 4 illustrates the sealing assembly 100 of the present invention in a lateral moving orientation. Thus, when the bolt 111 has engaged with the second side 126B of the slot 126, the strip 130 moves in unison with the carrier 120 in a laterally disposed manner.

Figure 5:
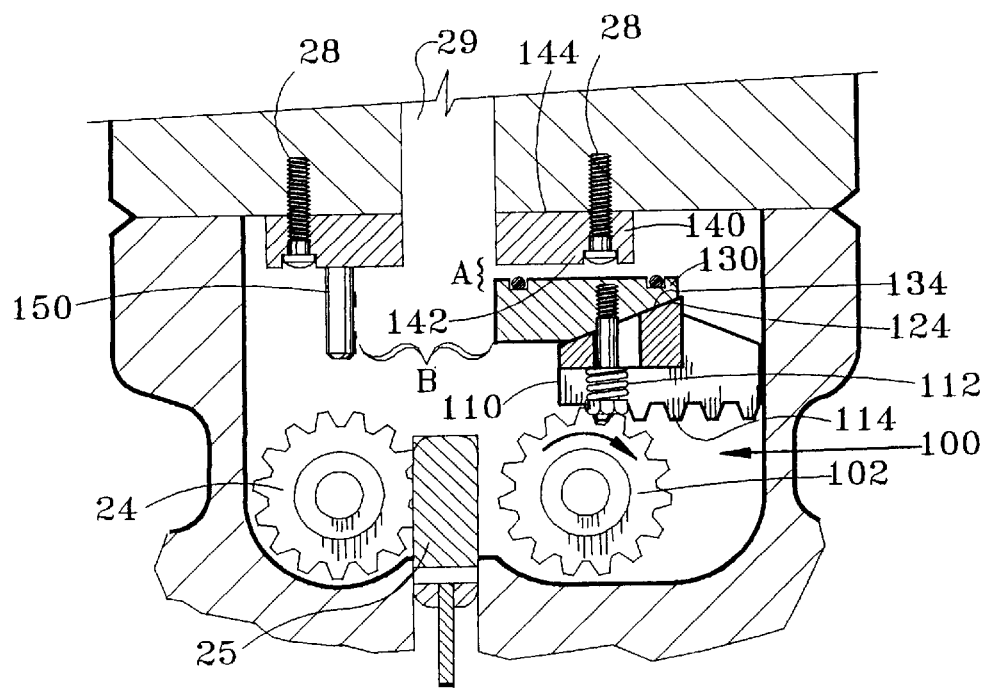
FIG. 5 illustrates the sealing assembly of the present invention in a fully displaced, open position.

FIG. 5 illustrates the sealing assembly 100 of the present invention in a fully displaced, open position. The second gap "B" between the strip 130 and the stop 150 is illustrated at its maximum. The strip 130 and the drive 110 have moved in unison so that the strip 130 is disposed outside of a channel defined by the aperture 29 from the upper chamber 32 to the lower chamber 22.

Figure 6:
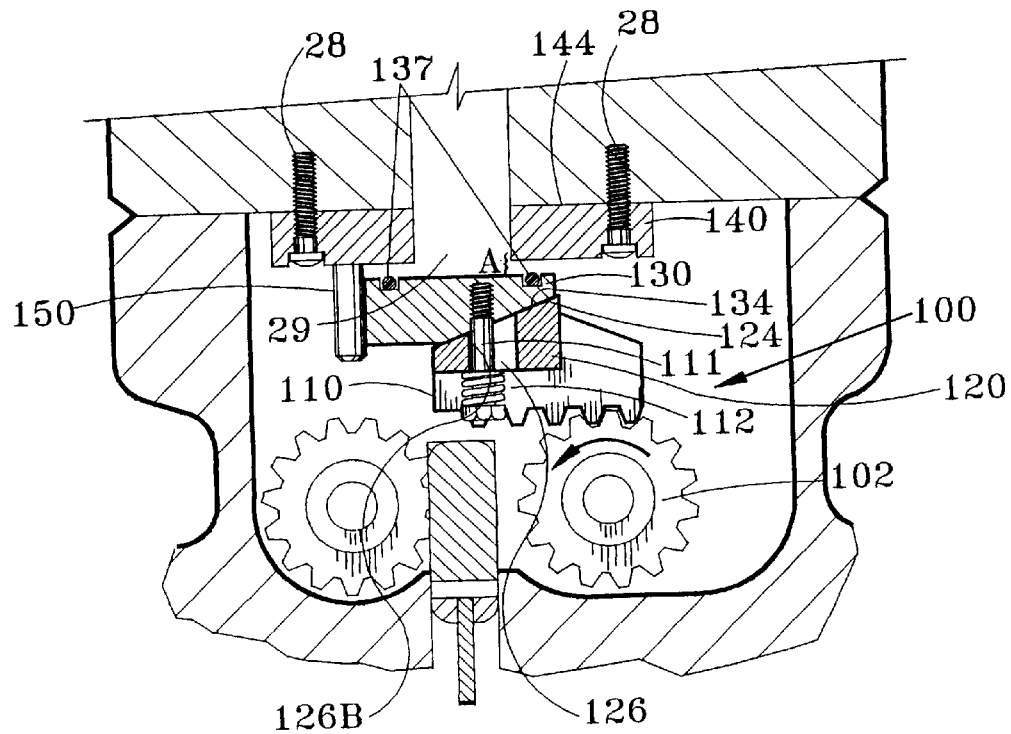
FIG. 6 illustrates the sealing assembly of the present invention in a concludingly open position.

FIG. 6 illustrates the sealing assembly 100 of the present invention in a concludingly open position. The sealing assembly 100 has moved laterally as indicated by the rotation of the gear 102. The drive 110, carrier 120 and strip 130 move, typically, in unison until such time as the strip 130 engages the stop 150. The stop 150 is positioned such that the engagement of the strip 130 therewith provides that the seal 137 is aligned to be in a concentric position with respect to the aperture 29. With the bolt 111 disposed against the second side 126B of the slot 126 in the carrier 120, the first gap "A" is still at its maximum displacement. As the gear 102 continues to rotate in a counter clockwise direction, as illustrate in FIG. 6, the bolt 111 will shift within the slot 126 and the strip 130 will cease to move in a lateral direction, but rather, will move in a direction orthogonal to the direction of the carrier 120. Thus, the strip 130 moves in a direction perpendicular to the seat 140 such that the seal 137 is engaged orthogonally with the seat 140. Such an engagement between the strip 130 and the seal 137 in association with the seat 140 provides that the seal 137 is fixedly secured with no possibility of damage due to sliding.

Figure 7:
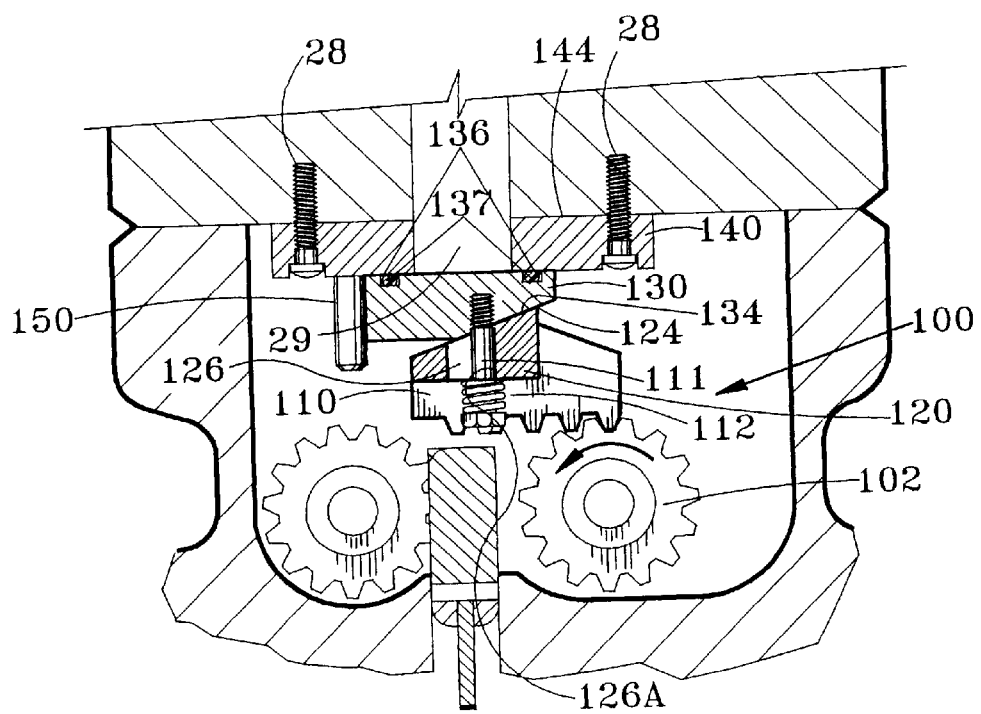
FIG. 7 is an enlarged detail view of FIG. 1 illustrating the sealing assembly of the present invention in a securedly closed position.

FIG. 7 is an enlarged detail view of FIG. 1 illustrating the sealing assembly 100 of the present invention in a securely closed position. The bolt 111 has been forced to shift to the first side 126A of the slot 126 within the carrier 120. As the gear 102 continues to move the drive 110 and the carrier 120 move in a lateral direction while the strip 130 is forced to move in an orthogonal direction thereto because of the sliding engagement of the respective sliding surfaces 124, 134.

Figure 8:
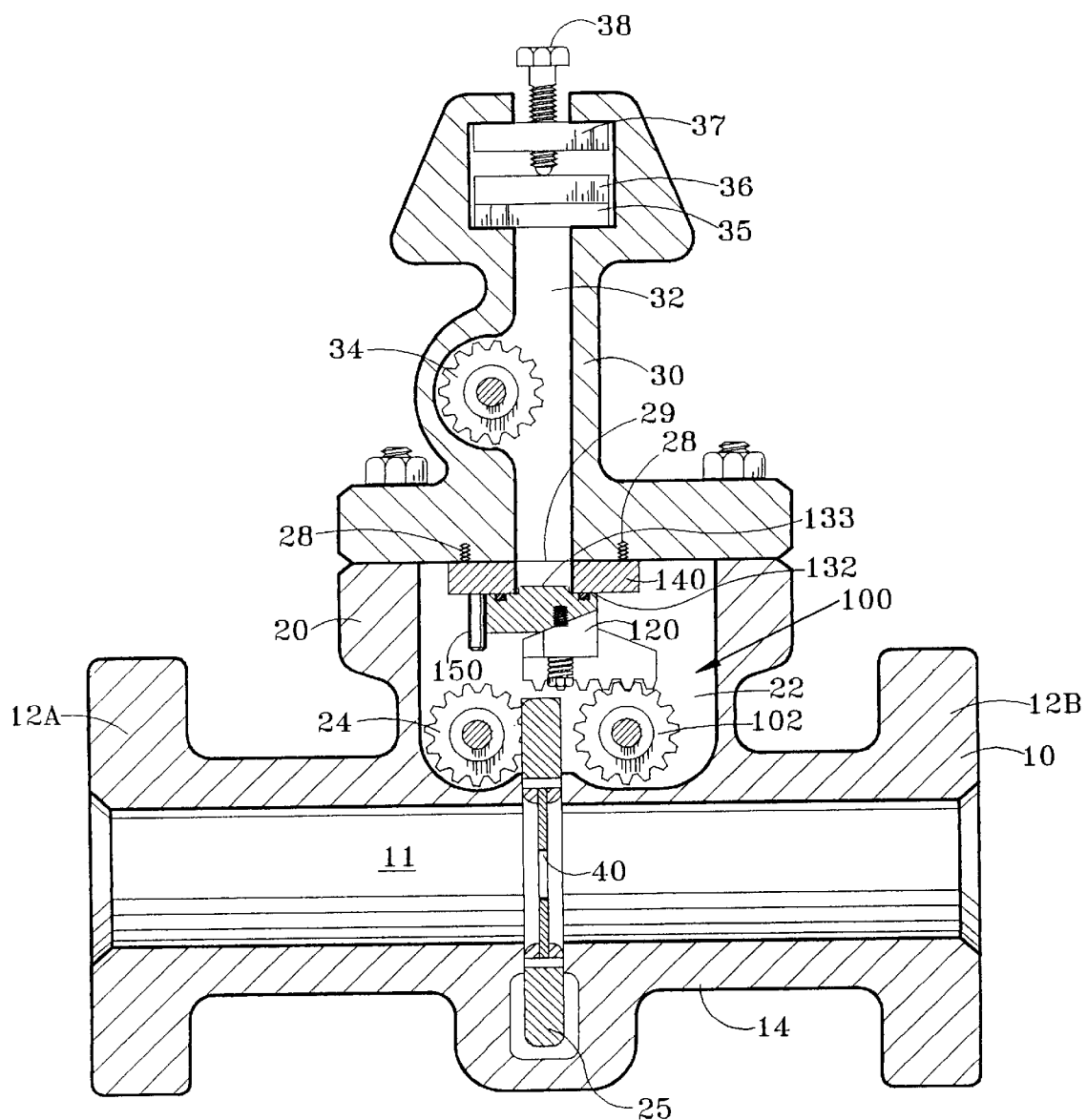
FIG. 8 illustrates a sectional elevation view of another preferred embodiment of the sealing assembly of the present invention in a dual-chamber orifice fitting having a sealing surface with a projection.

FIGS. 8 through 14 illustrate a sectional elevation view of another preferred embodiment of the present invention in a dual-chamber orifice fitting having an engaging or sealing surface 132 with a projection 133. FIG. 8 is similar to FIG. 1 with the respective parts identified by specific numbers which correspond to the numbers used in FIG. 1.

Figure 9:
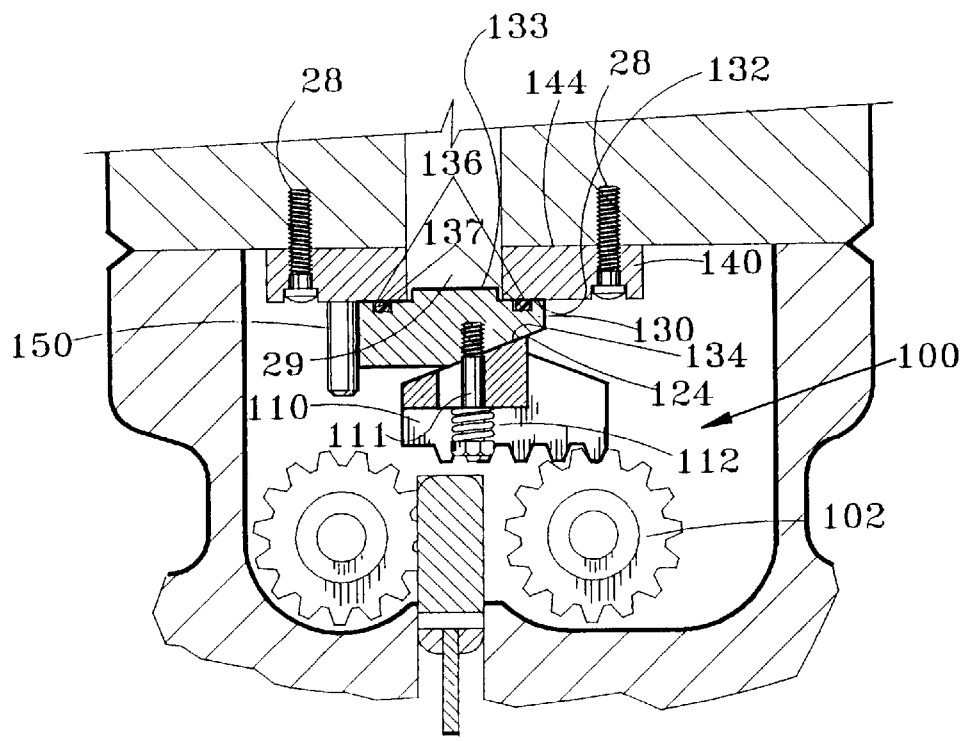
FIG. 9 is an enlarged detail view of FIG. 8 illustrating the sealing assembly of the present invention in a securedly closed position.

FIG. 9 is an enlarged detail view of FIG. 8 illustrating the sealing assembly 100 of the present invention in a securely closed position. It should be noted that the projection 133 of the strip 130 extends into the aperture 29 as the strip 130 is securedly engaged with the seat 140. FIG. 9 corresponds to FIG. 2 wherein like numbers represent like parts, except for the strip 130 which has the projection 133 emanating from the engaging surface 132.

Figure 10:
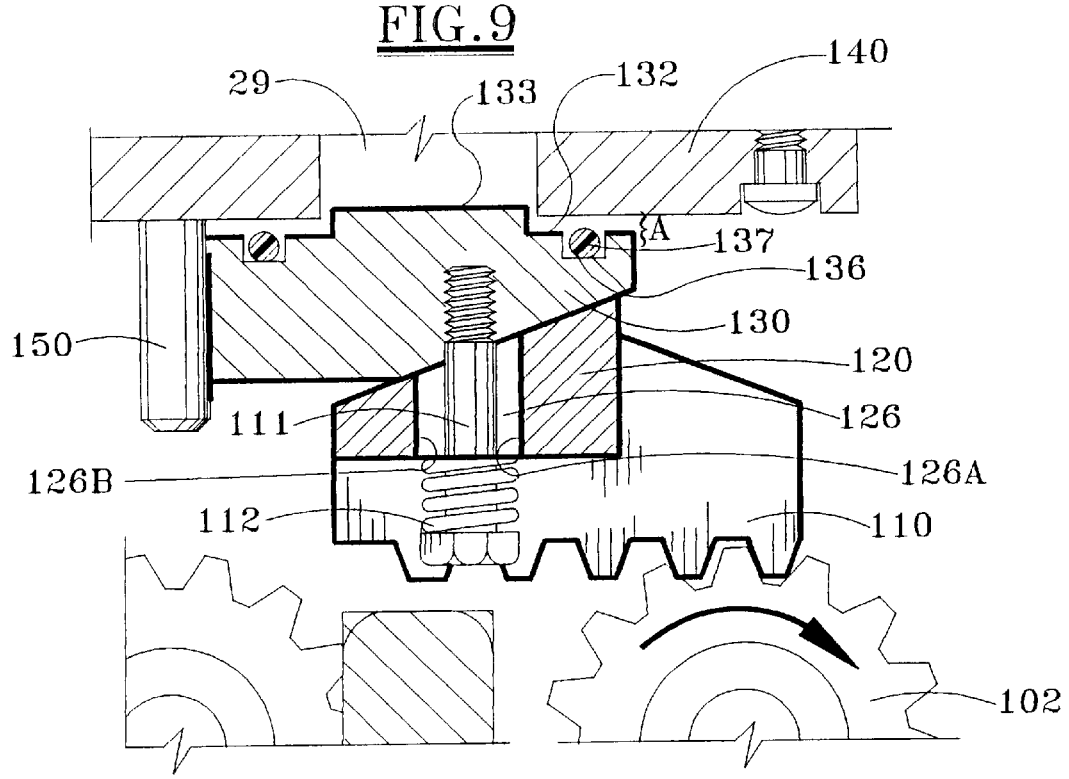
FIG. 10 is an enlarged detail view of FIG. 9 illustrating the sealing assembly of the present invention in an incipiently open position.

FIG. 10 is an enlarged detail view of FIG. 9 illustrating the sealing assembly 100 of the present invention in an incipiently open position. FIG. 10 corresponds to FIG. 3 wherein like numerals represent like components. Of particular importance in FIG. 10 is the disengagement of the bolt 111 from the first side 126A of the slot 126 such that the bolt is disposed intermediately within the slot 126 in the carrier 120. The distance the bolt 111 has moved within the slot 126 in the carrier 120 is proportional to the distance that the strip 130 has displaced from its engaging position with the seat 140. Particularly, the distance the bolt 111 is displaced within the slot 126 is proportional to the gap "A" between the strip 130 and the seat 140. It should be noted that the movement of the strip 130 caused by the movement of the bolt 111 in the slot 126 requires that the strip move orthogonal to the plane defined by the seat 140. The orthogonal movement of the strip 130 is directed and controlled by the respective angles which have been applied to the strip 130 and the carrier 120, respectively. As the gear 102 moves clockwise, as illustrated, the drive 110 is further displaced such that the bolt 111 continues to move from the first side 126A of the slot 126 to the second side 126B of the slot 126. It can be appreciated that any device that causes the orthogonal sealing of the aperture 29 is within the scope and intent of the present invention.

Figure 11:
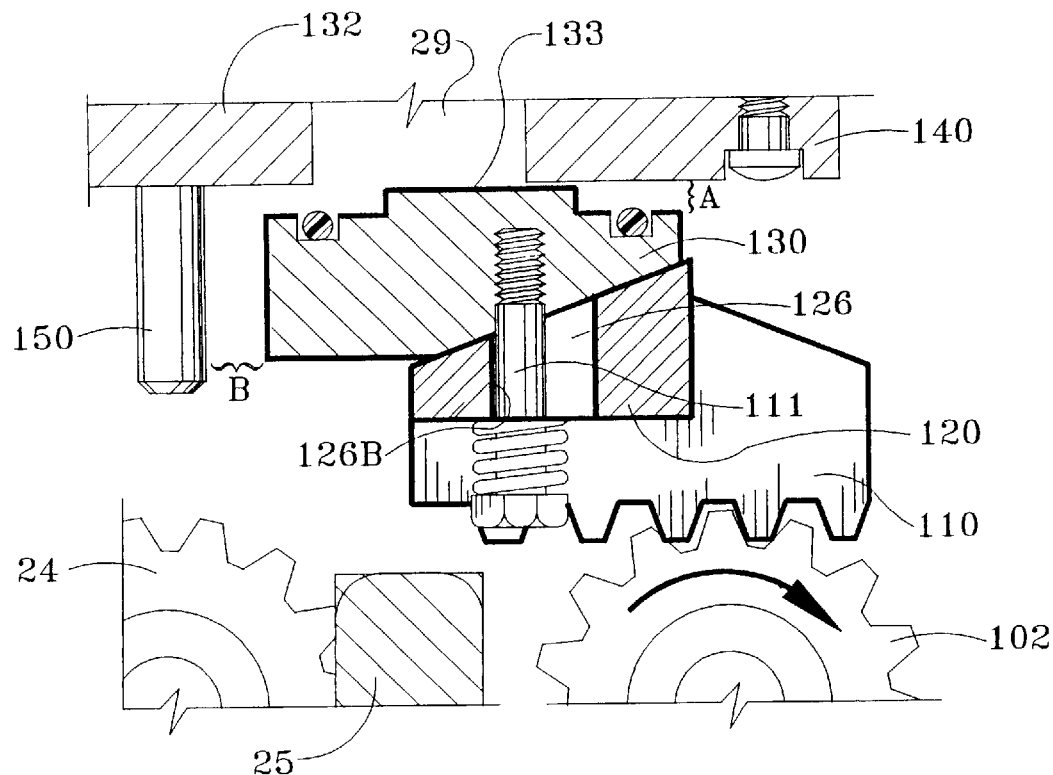
FIG. 11 illustrates the sealing assembly of the present invention in a partially displaced, open position.
Figure 12:
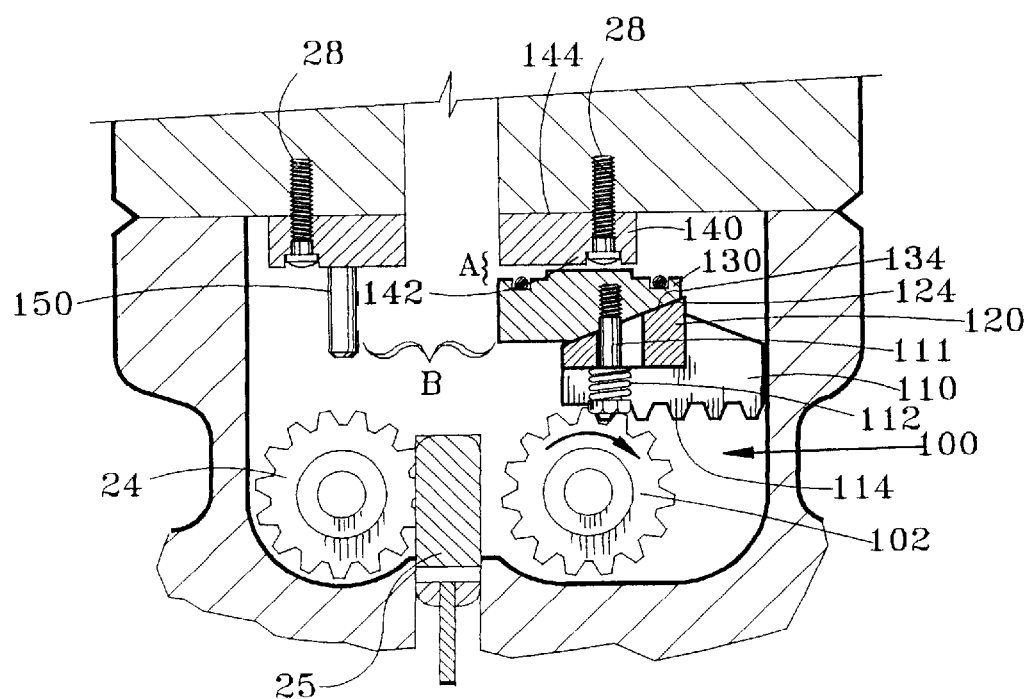
FIG. 12 illustrates the sealing assembly of the present invention in a fully displaced, open position.

FIGS. 11 and 12 illustrate the sealing assembly 100 of the present invention in a partially displaced, open position. FIGS. 11 and 12 illustrate the bolt 111 engaged with the second side 126B of the slot 126 such that the movement of the drive 110, the carrier 120 and the strip 130 will be in unison. Also, it should be noted that the gap "A" between the strip 130 and the seat 140 is at its maximum displacement. As the gear 102 continues to rotate clockwise, as illustrated, the gap "B" between the stop 150 and the strip 130 continues to increase. The gap "B" will increase until such time as the drive 110 has fully displaced the sealing assembly 100 from being within the channel defined by the aperture 29. It is appropriate, then, to engage the first plate gear 24 such that the plate carrier 25 is displaced from the channel 11 in the pipe section 14, and lifted into the upper chamber 32. For example, see FIGS. 1 and 8.

Figure 13:
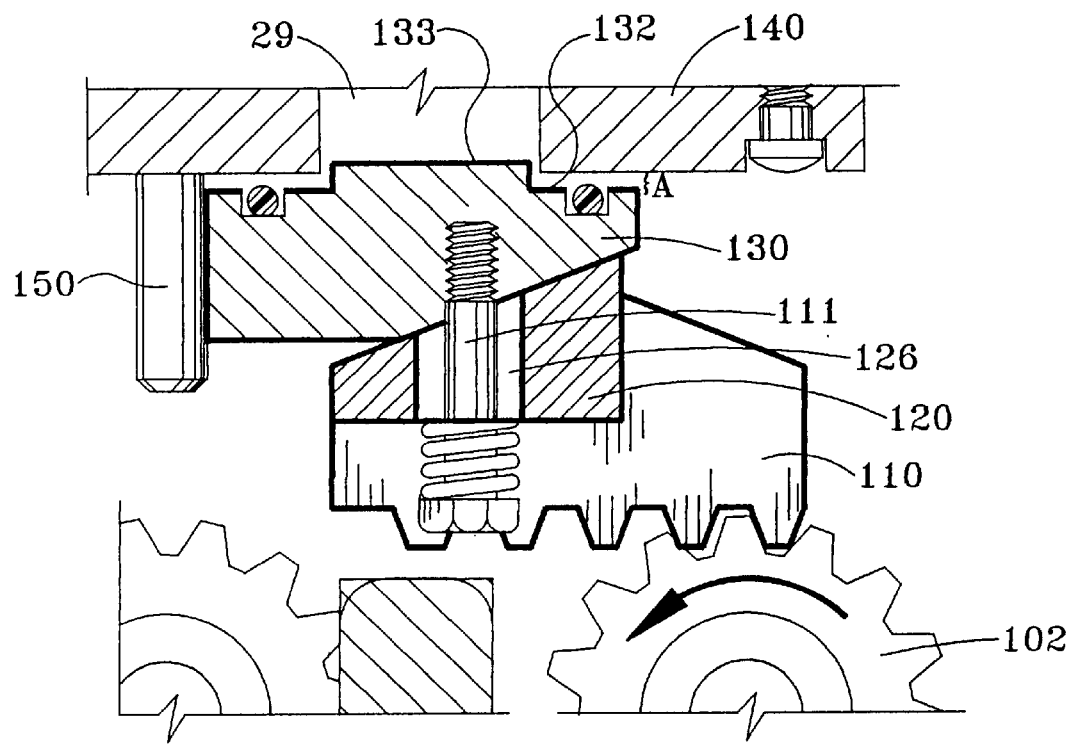
FIG. 13 illustrates the sealing assembly of the present invention in a concludingly open position.

FIG. 13 illustrates the sealing assembly 100 of the present invention in a concludingly open position. FIG. 13 illustrates the strip 130 to be engaged with the stop 150 such that the bolt 111 is intermediately displaced within slot 126 in the drive 110. As previously stated, when the bolt 111 is moving within the slot 126, the strip 130 is being displaced perpendicular to the seat 140. The movement of the bolt 111 in the slot 126 is directly proportional to the size of the gap "A" between the strip 130 and the seat 140. As the gear 102 continues to move counterclockwise, as illustrated in FIG. 13, the drive 110 pushes the carrier 120 such that the surfaces between the carrier 120 and the strip 130 are slideably engaged, and the strip 130 is moved orthogonally toward the seat 140. FIG. 13 illustrates the engaging surface 132 being slightly disposed from engagement with the seat 140 and the projection 133 being disposed within the aperture 29. The projection 133 and the engaging surface 132 form a corner for accepting the portion of the seat 140 defined by the aperture 29.

Figure 14:
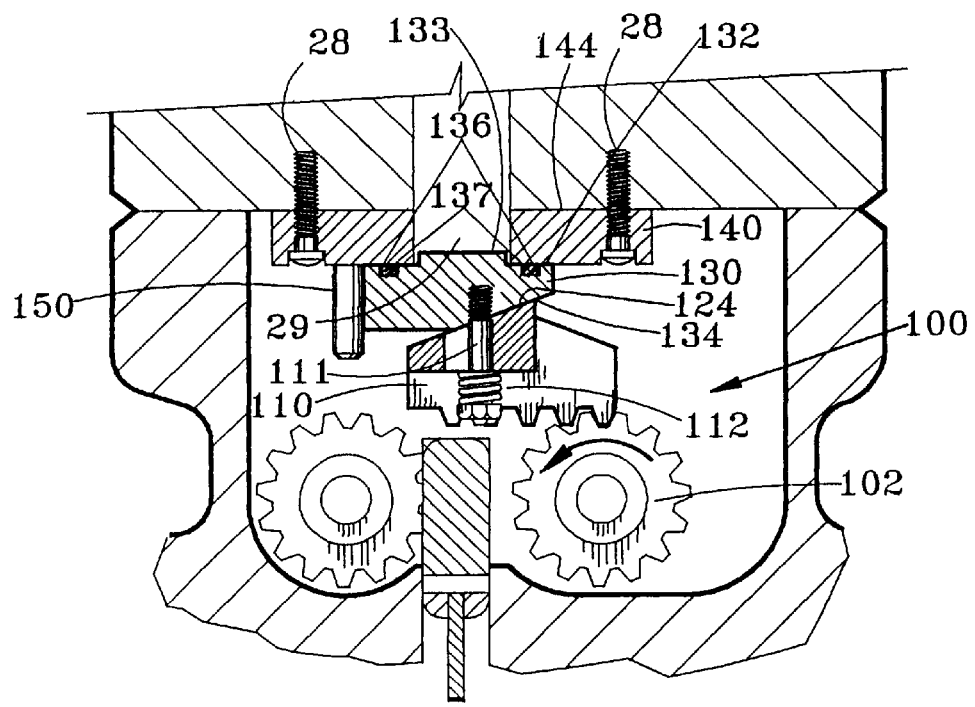
FIG. 14 is an enlarged detail view of FIG. 8 illustrating the sealing assembly of the present invention in a securedly closed position.

FIG. 14 is an enlarged detail view of FIG. 8 illustrating the sealing assembly 100 of the present invention in a securedly closed position. FIG. 14 corresponds to FIG. 7 wherein like numerals identify like parts. The difference between the two referenced figures is the engagement of the seat 140 with the engaging surface 132 such that the projection 133 is disposed within the aperture 29.

Figure 15:
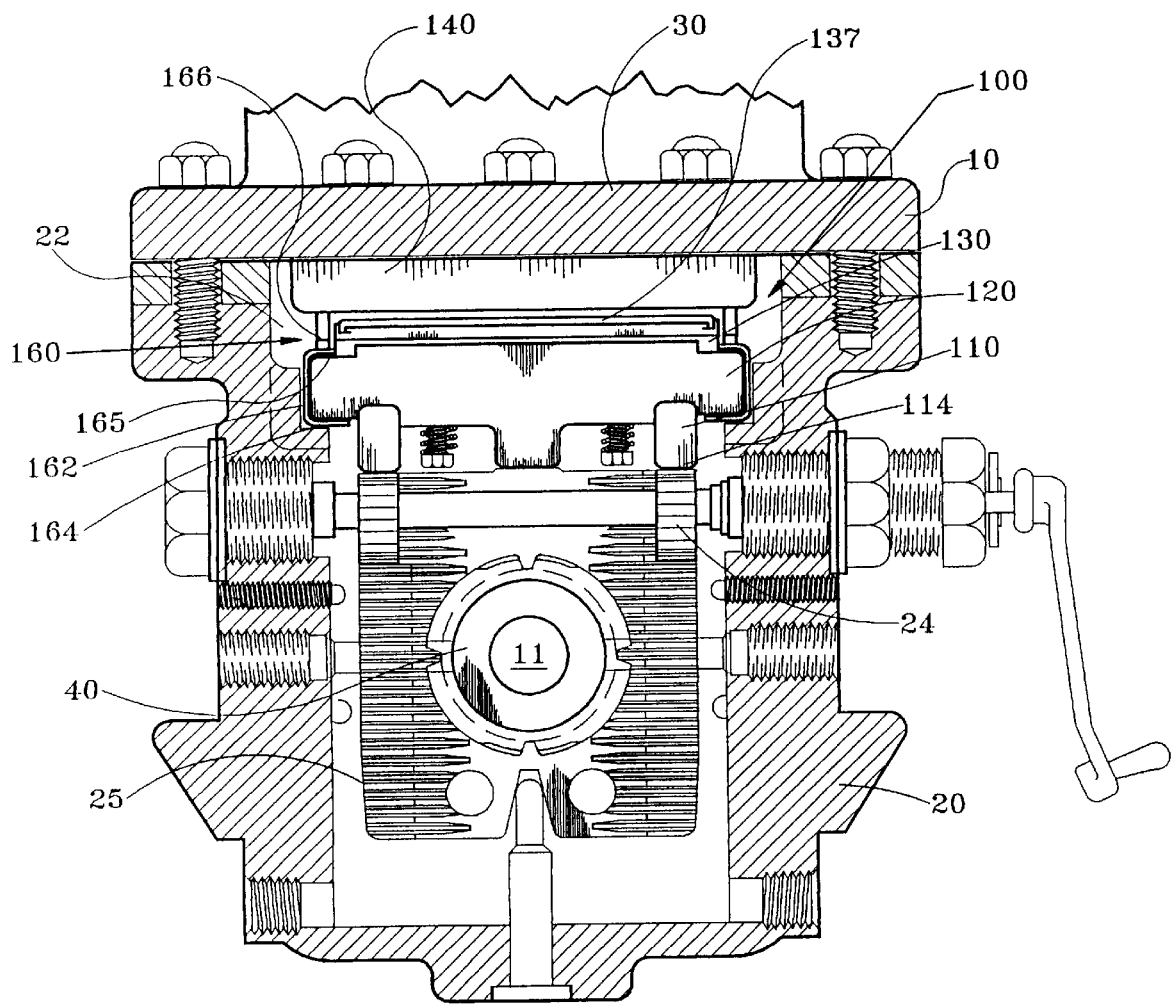
FIG. 15 is a sectional elevation view of a preferred embodiment of the sealing assembly of the present invention oriented at 90° to the illustrations in FIGS. 1 and 8 illustrating the relationship of the plate carrier to the sealing assembly.

FIG. 15 is a sectional, elevation view of a preferred embodiment of the present invention oriented at 90 degrees to the illustrations in FIGS. 1 and 8. FIG. 15 illustrates the relationship of the plate carrier 25 to the sealing assembly 100. Particularly, the plate carrier 25 contains the orifice plate 40. The plate carrier 25 and orifice plate 40 are disposed within the channel 11 of the pipe section 14. For example, see FIGS. 1 and 8. The sealing assembly 100 is disposed within the lower chamber 22 of the fitting assembly 10. The gear 102 is illustrated engaged with the drive 110. The drive 110 is associated with the carrier 120. The carrier 120 receives the strip 130. The strip 130 has therein the seal 137. Engaged with the carrier 120 is the spring loading carrier guide 160. Particularly, illustrated in FIG. 15 is the spring member 166, the securing member 162, the first bracket 164, and the second bracket 165. The spring member 166 engages the surface of the seat 140 such that the sealing assembly 100 actively engages the gear 102. Without the spring-loaded carrier guide 160, the sealing assembly 100 can displaced such that the gear 102 is disengaged from the teeth 114 in the drive 110. The entire assembly, as illustrated in FIG. 15, provides a secured positive action engagement such that the sealing assembly 100 is actively engaged whenever the gear 102 is activated by the illustrated handle.

Figure 16:
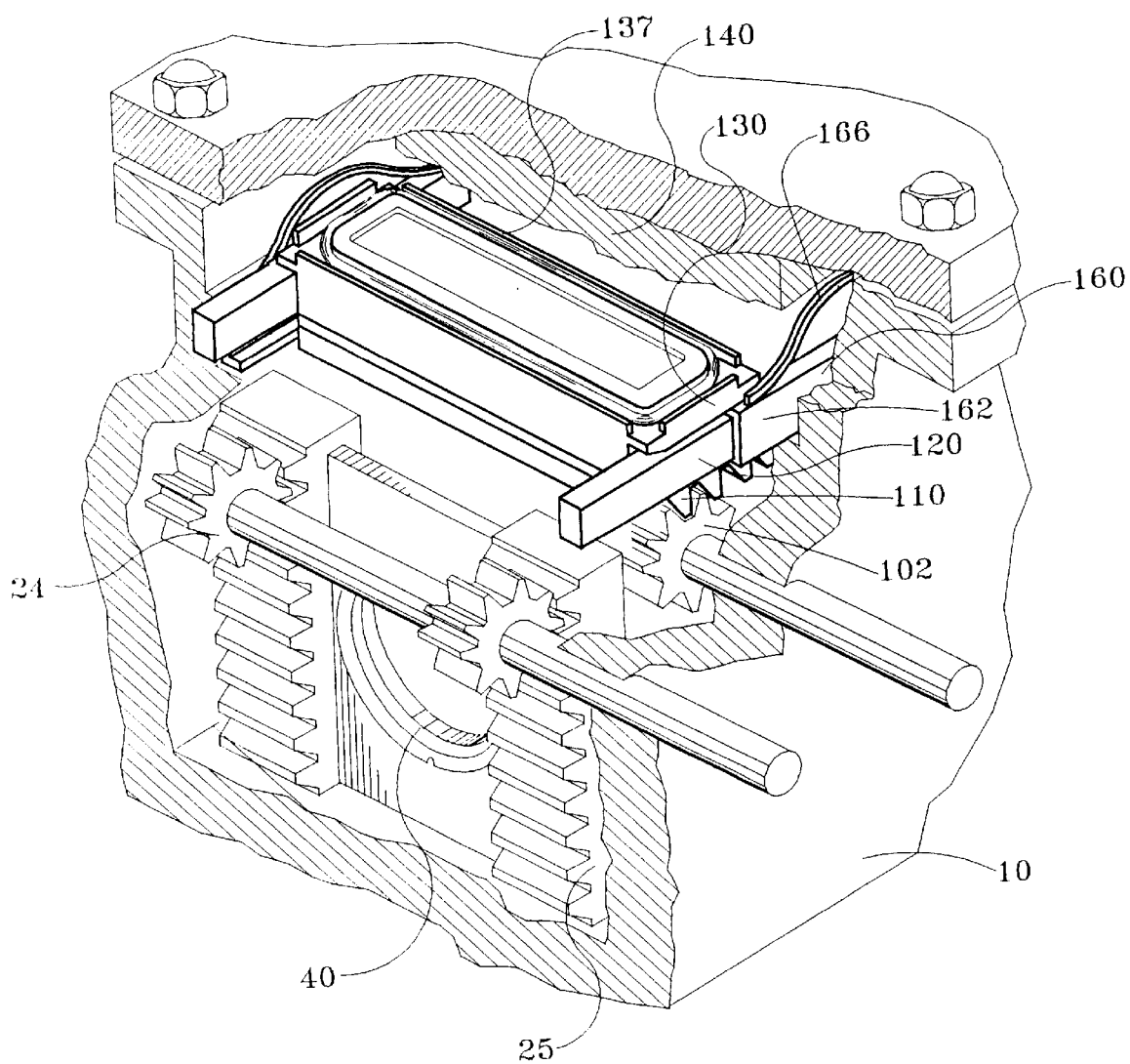
FIG. 16 is a perspective, cut-away view of a preferred embodiment of the present invention illustrating the relationship of the plate carrier, the rack and pinion, the sealing assembly, the spring-loaded carrier guide and the housing of the fitting.

FIG. 16 is a perspective, cut-away view of a preferred embodiment of the present invention illustrating the relationship of the carrier 120, the gears 102, the drive 110, the sealing assembly 100, the spring-loaded carrier guide 160 and the fitting assembly 10. The orifice plate 40 is illustrated in the plate carrier 25 which is moved using the first plate gear 24. The carrier 120 is illustrated engaged in with the gear 102. The carrier 120 is configured with the strip 130 such that the strip accepts the spring-loaded carrier guide 160 along the extremes thereof. The spring member 166 engages the seat 140 on the inside such that the sealing member 100 is slideably secured for activation by the gear 102.

Figure 17:
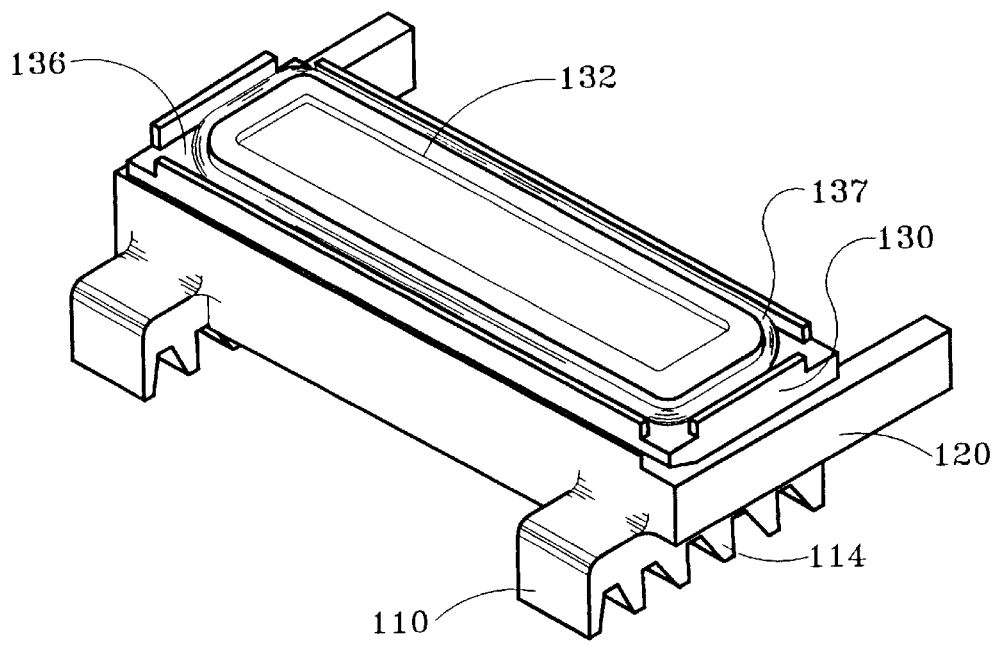
FIG. 17 is a perspective view of a preferred embodiment of the sealing assembly of the present invention.

FIG. 17 is a perspective view of a preferred embodiment of the sealing assembly 100 of the present invention. The drive 110 and carrier 120 are illustrated as a unitary member. The drive 110 has a plurality of teeth 114. The strip 130 slideably engages the carrier 120. The strip 130 has a seal 137 within a groove 136. The strip 130 also has an engaging surface 132.

Figure 18:
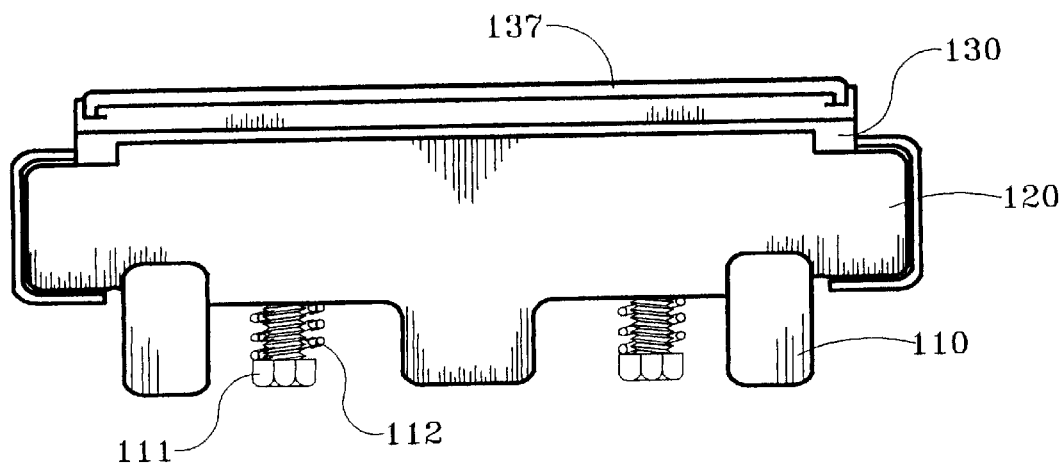
FIG. 18 is an elevation view of the sealing assembly of the present invention as illustrated in FIG. 17.

FIG. 18 is an elevation view of the sealing assembly 100 of the present invention as illustrated in FIG. 17. The drive 110 is illustrated having associated therewith a bolt 111 and a spring 112. The friction between the carrier 120 and the strip 130 is controlled by tightening the spring 112 with the bolt 111. Also illustrated in FIG. 18 is the seal 137. It can be appreciated by those skilled in the art that any means adapted to control the friction between the carrier 120 and the strip 130 is within the scope and intent of the present invention.

Figure 19:
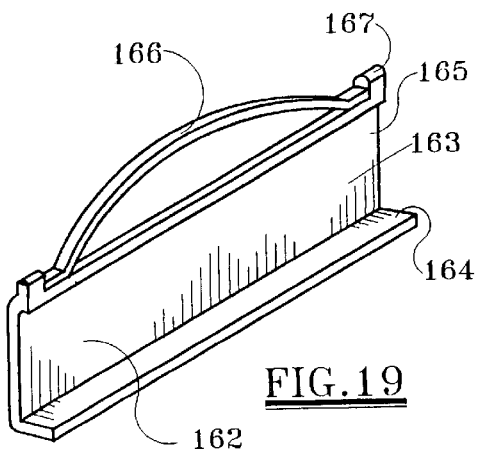
FIGS. 19 and 19A are perspective views of one embodiment of the spring-loaded carrier guide of the present invention illustrating projecting members at the extremes of the center-spring member.
Figure 19A:
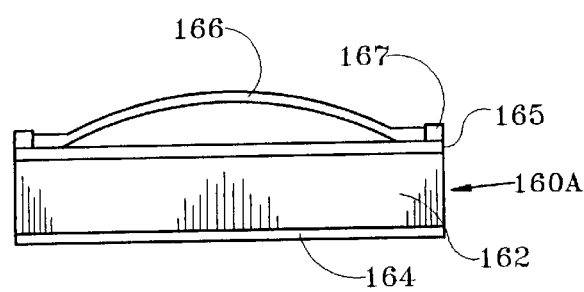

FIGS. 19 and 19A are perspective views of one embodiment of the spring-loaded carrier guide 160A of the present invention illustrating protruding lands 167 at the extremes of the center-spring member 166. The spring-loaded carrier 160A comprises a securing member 162 and a convexed spring member 166. The securing member 162 has a base 163, a first bracket 164 and second bracket 165. The convexed spring member 166 has lands 167 disposed at its extremity.

Figure 20:
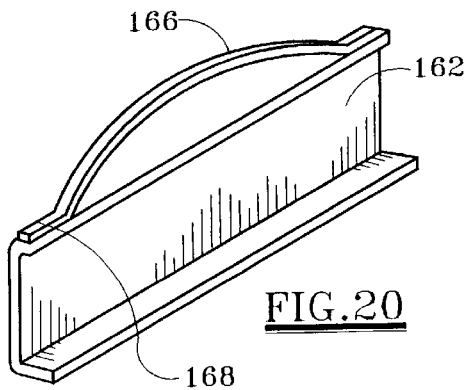
FIGS. 20 and 20A are perspective views of another embodiment of the spring-loaded carrier guide of the present invention illustrating the flat extremes of the center-spring member.
Figure 20A:
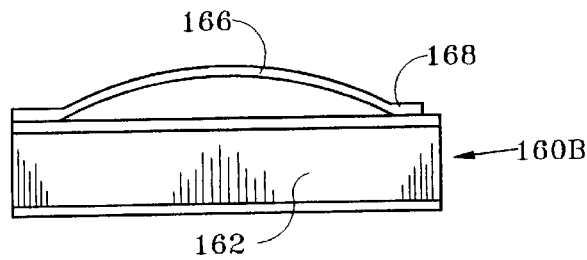

FIGS. 20 and 20A are perspective views of another embodiment of the spring-loaded carrier guide 160B of the present invention illustrating the flat extremes of the center-spring member 166. The spring-loaded carrier guide 160C has a securing member 162 and a convexed spring member 166. The convexed spring member 166 has a planar portion 168 at its extremity.

Figure 21:
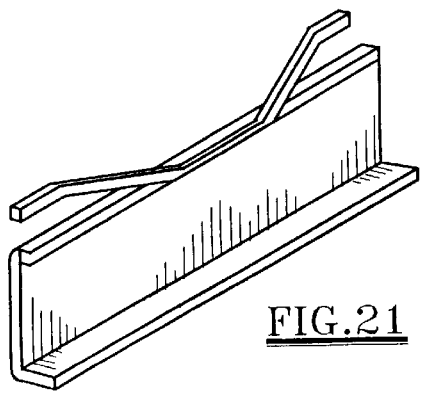
FIGS. 21 and 21A are perspective views of yet another embodiment of the spring-loaded carrier guide of the present invention illustrating the remote-spring members disposed to opposite sides of the carrier guide and having a planar contact with the carrier guide.
Figure 21A:
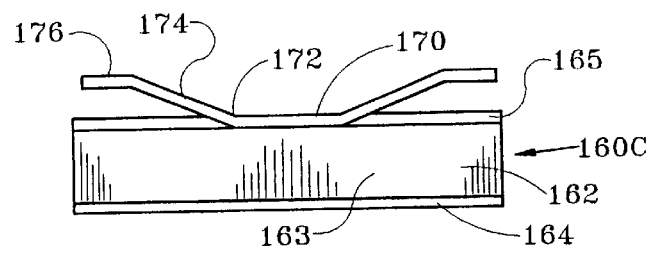

FIGS. 21 and 21A are perspective views of yet another embodiment of the spring-loaded carrier guide 160B of the present invention illustrating remote-spring members disposed to opposite sides of the carrier guide 160C and having planar contact. Particularly, the carrier guide 160C comprises a securing member 162 and an angularly concaved spring member 170. The securing member 162 has a first bracket 164 and a second bracket 165 disposed between a base 163. The angularly concaved spring member 170 comprises a connecting portion 172, a leaf portion 174 and an engaging portion 176. The engaging portion 176 is designed to engage the seat 40 at alternate locations rather than at a single location as illustrated in FIGS. 15, 16, 19, 19A, 20 and 20A.

Figure 22:
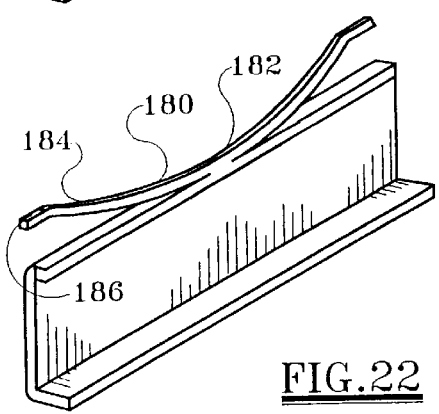
FIGS. 22 and 22A are perspective views of yet still another embodiment of the spring-loaded carrier guide of the present invention illustrating the remote-spring members disposed to opposite sides of the carrier guide and having a tangent contact with the carrier guide.
Figure 22A:
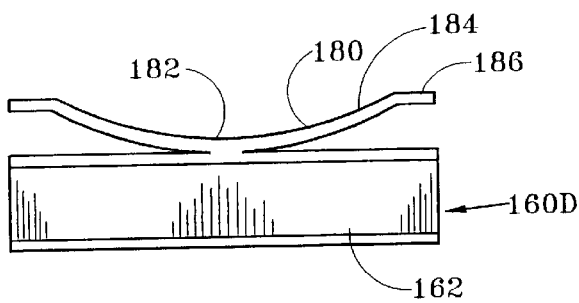

FIGS. 22 and 22A are perspective views of yet still another embodiment of the spring-loaded carrier guide 160D of the present invention illustrating the remote-spring members exposed to opposite sides of the carrier guide 160D and having a tangent contact. The carrier guide 160D has a securing member 162 and an arced concaved spring member 180. The arced concaved spring member 180 comprises a connecting portion 182, an arced portion 184 and an engaging portion 186.

It can be appreciated that many and numerous carrier guides 160 are possible using differing configurations. However, it is part of the present invention to adapt the carrier guide 160 with the sealing assembly 100 such that the overall unit provides an actively engaging embodiment. Also, as apparent to those skilled in the art, various sealing assembly devices may also be available to those skilled in the art which are within the scope and intent of the present invention. However, it is part of the present invention to implement a secured sealing assembly 100 as illustrated in the present disclosure.

FIG. 23 is a flow diagram illustrating a method of the present invention. A method for securing an opening in a fitting assembly for use with an orifice plate is provided. The opening has a seat with a seating surface and the fitting assembly comprises a drive, a carrier, a strip, a stop and a guide. The method comprises actuating the drive such that the carrier is associated with the drive and moveably actuated by the drive. Engaging the strip with the drive for moving the strip with the drive or at a right angle to the drive. Engaging the stop with the strip. When the strip and the stop are engaged, the strip moves at a right angle to the drive, When the strip and the stop are not engaged, the strip moves with the drive. And, securing the strip with the guide, the carrier and the drive for operation in any orientation. When the stop is sufficiently displaced from the drive and the strip, the opening in the seat is unobstructed, and when the stop has engaged the strip and the drive is moving toward the nearest position to the stop, the strip is approaching the seat in a parallel manner so that when the drive is in its nearest position to the stop, the strip is securely engaged with the seat for securing the opening in the seat.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A sealing assembly for securing an opening in a seat having a seating surface, the sealing assembly comprising a drive, a carrier, a strip, a stop and a guide such that
    (a) the drive is actuateable for movement,
    (b) the carrier is associated with the drive and moveably actuated by the drive,
    (c) the strip is engaged with the drive for moving in at least one of with the drive and at a right angle to the drive,
    (d) the stop is engageable with the strip such that when the strip and the stop are engaged, the strip moves at a right angle to the drive, and when the strip and the stop are not engaged, the strip moves with the drive,
    (e) the guide secures the strip, the carrier and the drive for operation in any orientation,
        such that when the stop is sufficiently displaced from the drive and the strip, the opening in the seat is unobstructed, and when the stop has engaged the strip and the drive is moving toward the nearest position to the stop, the strip is approaching the seat in a parallel manner so that when the drive is in its nearest position to the stop, the strip is securedly engaged with the seat for securing the opening in the seat.

2. The sealing assembly for securing an opening in a seat as defined in claim 1 wherein the drive and the carrier are a unitary member, defined as the drive/carrier.

3. The sealing assembly for securing an opening in a seat as defined in claim 1 wherein the strip and the carrier are repose so as to provide movement of the strip in at least one direction of in the same plane as the movement of the carrier and perpendicular to the same plane as the movement of the carrier.

4. The sealing assembly of claim 1 wherein the carrier includes a carrier sliding surface and the strip includes a strip sliding surface slidably engaging said carrier sliding surface, the sliding surfaces forming an acute angle with the seating surface, wherein during movement between the intermediate and sealed positions, the carrier slides along the strip sliding surface and forces the strip to move substantially perpendicularly to the seating surface.

5. The sealing assembly of claim 1 wherein said sealing surface has a sealing means secured thereto.

6. The sealing assembly of claim 1 wherein the carrier is connected to the strip by a connector, the connector being adapted to limit the range of sliding movement of the carrier relative to the strip, the connector means further being adapted to permit sliding movement of the carrier relative to the strip when the strip engages the stop.

7. The sealing assembly of claim 6 wherein the connector comprises:
   at least one fastener secured to the strip and being disposed within an aperture in the carrier; and
   a biasing means urging the carrier sliding surface against strip sliding surface.

8. The sealing assembly of claim 1 further comprising a guide adapted to maintain the drive in operative engagement with the actuating means.

9. A sealing assembly for sealing an opening, the opening having about its periphery a planar sealing surface, the assembly comprising:
   (a) a seal in the shape of a prism having two bases connected by at least three lateral edges connected to the bases such that the lateral edges define lateral faces with one face being a sealing face and another face being a first gradient face, the sealing face having a dimension larger than the opening to be secured and further the sealing face having a planar portion with a dimension for engaging the planar sealing surface about the periphery of the opening, the first gradient face forming an acute angle with the sealing face;
   (b) a carrier in the shape of a prism having two bases connected by at least three lateral edges connected to the bases such that the lateral edges define lateral faces with one face being a second gradient face, the second gradient face of said carrier slidably engaged with the first gradient face of said seal;
   (c) a connector for movably connecting said seal and said carrier for limiting the sliding relationship between the first gradient face of said seal and the second gradient face of said carrier, and further said connector for maintaining parallel the sealing face of said seal and the planar surface about the opening;
   (d) a driver engaged with and for laterally moving said carrier with respect to the opening such that the range of movement of said carrier includes the location defined by said carrier and said seal being located outside of the area encompassed by extending the perimeter of the opening in the direction of said seal, and the location defined by said carrier positioning said seal to be in alignment with the opening;
   (e) a stop for abutting a face of said seal when said driver positions said seal such that the planar portion of the sealing face is in registry with and perpendicular to the planar surface about the periphery of the opening;
   (f) a guide secures the sealing assembly for operation in any orientation,
      such that the range of sliding movement between the first gradient face of said seal and the second gradient face of said carrier caused by said driver moving said carrier in conjunction with said connector maintaining the sealing face of said seal parallel to the planar surface about the opening provides that when said carrier and said seal are located outside of the area defined by extending the perimeter of the opening in the direction of said seal, the sealing face and surface are disengaged and the opening is unobstructed, and when said carrier positions said seal to be in alignment with the opening, said stop is abutted causing the sliding of the first gradient face on the second gradient face for perpendicularly moving the sealing face toward the planar surface about the opening, while maintaining a parallel relationship between the sealing face and the planar surface, for securedly engage the sealing face and the planar surface for sealing the opening.

10. The sealing assembly defined in claim 9, wherein said seal further comprises a groove in the sealing face of said seal for accepting a resilient member such that the resilient member orthogonally engages the planar surface surrounding the opening for sealing the opening.

11. The sealing assembly defined in claim 9 further comprising a groove in the planar surface around the opening for accepting a resilient member such that the resilient member orthogonally engages the sealing face of said seal for sealing the opening.

12. The sealing assembly defined in claim 9 wherein said connector further comprises a projection secured to said seal and extending from the first gradient face of said seal, the projection passing through a slot in said carrier providing that when the projection moves in the slot, said seal is moved along said carrier via the first and second gradient faces for perpendicularly moving the sealing face toward the planar surface about the opening, while maintaining a parallel relationship between the face and the surface, for securedly engaging the sealing face and the planar surface for sealing the opening.

13. A method for securing an opening in a fitting assembly for use with an orifice plate, the opening has a seat with a seating surface, the fitting assembly comprising a drive, a carrier, a strip, a stop and a guide, the method comprising the steps of:
   (a) actuating the drive such that the carrier is associated with the drive and moveably actuated by the drive,
   (b) engaging the strip with the drive for moving in at least one of with the drive and at a right angle to the drive,
   (c) engaging the stop with the strip such that when the strip and the stop are engaged, the strip moves at a right angle to the drive, and when the strip and the stop are not engaged, the strip moves with the drive, and
   (d) securing the strip with the guide, the carrier and the drive for operation in any orientation,
      such that when the stop is sufficiently displaced from the drive and the strip, the opening in the seat is unobstructed, and when the stop has engaged the strip and the drive is moving toward the nearest position to the stop, the strip is approaching the seat in a parallel manner so that when the drive is in its nearest position to the stop, the strip is securedly engaged with the seat for securing the opening in the seat.

14. A sealing assembly for seating an opening in a seat having a seating surface, the assembly comprising:
   a drive operatively connected to an actuation means;
   a carrier secured to the drive;
   a strip operatively connected to the carrier, the strip having a sealing surface; and
   a stop secured to the seating surface;
   wherein the drive is adapted to move the strip between an open position, an intermediate position, and a sealed position, such that in the open position, the strip does not obstruct the opening, in the intermediate position, the strip engages the stop, and in the sealed position, the strip engages the stop and is moved into sealing engagement with the opening.

* * * * *